(12) United States Patent
Killian et al.

(10) Patent No.: US 6,356,970 B1
(45) Date of Patent: Mar. 12, 2002

(54) INTERRUPT REQUEST CONTROL MODULE WITH A DSP INTERRUPT VECTOR GENERATOR

(75) Inventors: Harrison Killian, Kaysville; David Moore, Riverton; Jeff Harrell, West Jordan; Shayne Messerly, Farmington; Brady Brown, Centerville; Garn Morrell, Kaysville; Gerald Wilson, South Jordan, all of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,955

(22) Filed: May 28, 1999

(51) Int. Cl.[7] .......................... G06F 13/24; G06F 13/32
(52) U.S. Cl. .......................... 710/269; 710/260; 710/50
(58) Field of Search .................. 710/260–269, 710/48, 50

(56) References Cited

U.S. PATENT DOCUMENTS 4,901,275 A * 2/1990 Hardie et al. ................ 710/69
5,568,649 A * 10/1996 MacDonald et al. .......... 710/48
6,058,441 A * 5/2000 Shu ............................ 710/100

* cited by examiner

Primary Examiner—Rupal Dharia
(74) Attorney, Agent, or Firm—Michaelson & Wallace; Peter L. Michaelson; Robert M. Wallace

(57) ABSTRACT

In a system having an DSP, an ASIC and a memory, in which the ASIC generates a number of different competing interrupts for the DSP to service, the ASIC has an interrupt request control module which automatically provides the DSP with a vector pointing to the memory location of the interrupt service routine for the currently pending interrupt request having the highest priority of all pending requests. The DSP reads this vector and uses it to access the interrupt service routine in the memory. Reading of this vector causes the interrupt request to be de-asserted, which causes the next highest priority pending interrupt request to become the highest priority pending interrupt request. As a result, a new vector is presented for the next read by the DSP.

15 Claims, 4 Drawing Sheets

INTERRUPT REQUEST CONTROL MODULE WITH A DSP INTERRUPT VECTOR GENERATOR

BACKGROUND OF THE INVENTION

1. Technical Field

The invention is related to a modem having an application specific integrated circuit (ASIC) controlled by a digital signal processor (DSP) which receives interrupt requests from the ASIC.

2. Background Art

Modulator-demodulator (modem) circuits commonly used in personal computers to interface with a telephone line can be implemented with a DSP, which performs the processing tasks, a memory, and an ASIC which provides data transfer between the DSP and the main bus of the personal computer. The ASIC consists of a number of modules and sub-modules, each of which can assert an interrupt request to the DSP, so that at any one time there may be several interrupt requests pending for the DSP to service. In order to service a particular one of the pending interrupt requests, the DSP must (1) determine which one of the modules or sub-modules in the ASIC was the source of the interrupt request, and then (2) determine the location in the memory of the appropriate interrupt service routine (ISR) for servicing an interrupt request of that particular module or sub-module. These two determinations which the DSP must make require a certain amount of time and therefore increase the interrupt servicing latency, a significant problem.

SUMMARY OF THE INVENTION

The foregoing limitations are overcome in the present invention by having the ASIC itself automatically provide the DSP with a vector pointing to the memory location of the interrupt service routine for the currently pending interrupt request having the highest priority of all pending requests. The DSP reads this vector and uses it to access the interrupt service routine in the memory. Reading of this vector causes the interrupt request to be de-asserted, which causes the next highest priority pending interrupt request to become the highest priority pending interrupt request. As a result, a new vector is presented for the next read by the DSP, and the cycle continues.

In a preferred embodiment, a modem includes a DSP, an ASIC which generates N interrupt requests to be serviced by the DSP, a memory accessible by the DSP and containing at respective address locations therein individual interrupt services routines to be executed by the DSP in servicing respective ones of the interrupt requests, and a DSP bus connected to the DSP, the ASIC and the memory. An interrupt request status register (ICSR) is connected to receive the N interrupt requests and has N flags corresponding to respective ones of the N interrupt requests which reflect their pending status (or lack thereof). The flags are associated with respective numbers according to a priority ranking of the interrupt requests. A look-up table stores, by the respective numbers, vectors corresponding to the respective address locations, the look-up table having a look-up table input and a look-up table output providing a vector corresponding to a number received at the look-up table input. An interrupt control vector register (ICVR) is connected to the look-up table output and is read by the DSP, so that the ICVR contains a vector provided by the look-up table output. A controller has a controller input connected to the ICSR and a controller output specifying the respective number of the highest priority pending flag in the ICSR, the output being coupled to the look-up table input. The controller changes the status of a pending flag in the ICSR upon the DSP reading the corresponding vector in the ICVR, whereby the contents of the ICVR is updated to reflect the current highest priority pending interrupt request.

Preferably, the look-up table further contains a null vector. The controller specifies the null vector to the look-up table input whenever none of the N interrupt requests is pending. As a result, the ICVR contains the null vector in the absence of pending interrupt requests.

The ICSR, the ICVR, the look-up table and the controller preferably are within the ASIC.

DETAILED DESCRIPTION OF THE PREFERRED EMBODIMENTS

Figure 1:
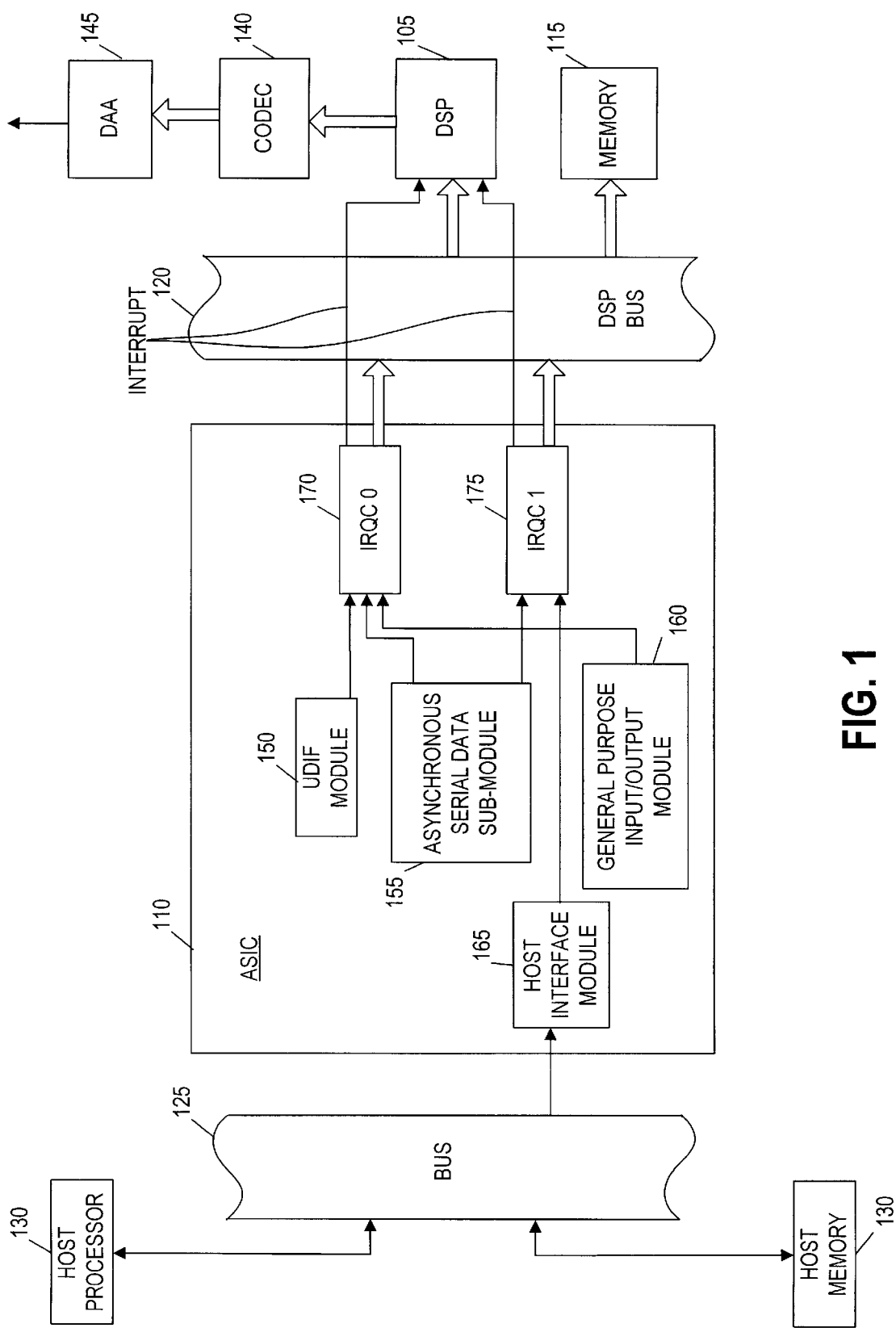
FIG. 1 is a system diagram of a modem circuit board embodying features of the present invention.

Referring to FIG. 1, a preferred modem circuit board 100 includes a DSP 105, an ASIC 110, a memory 115 and a DSP bus 120 to which the DSP 105, the ASIC 110 and the memory 115 are connected. The ASIC 110 is connected to a main bus 125 which is connected to computer components such as a host processor 130 and a host memory 135. The DSP 105 is connected to an external interface (e.g., a telephone jack) via a coder-decoder (codec) 140 and a data access arrangement (DAA) module 145. The ASIC 110 in a preferred implementation consists of a number of modules and sub-modules. These include a universal asynchronous receiver-transmitter (UART)-DSP interface (UDIF) module 150, a serial data module 155, a general purpose input/output (GPIO) module 160 and a host interface module 165, among others. The DSP 105 is a typical commercially available part, while the ASIC 110 is a customized circuit.

In the ASIC, each module or sub-module may assert an interrupt request to the DSP 105, for example when that module has data for the DSP. The DSP 105 typically has only four interrupt input lines. In order to reduce the number of separate interrupt lines from the ASIC 110 to the DSP 105, interrupt request control modules 170, 175 each accept multiple (e.g., 8) interrupt requests from different modules in the ASIC and output a single interrupt to the DSP 105 on a separate interrupt line running to the DSP shown in FIG. 1.

Conventionally, the DSP 105 was forced to take time after receiving an interrupt request to determine the source of the interrupt and then, from that information, deduce the location of the appropriate interrupt service routine in memory. The time consumed while the DSP performed these tasks increased the latency of the interrupt servicing by the DSP.

In order to reduce or eliminate such delays, in accordance with the present invention each interrupt request control module 170, 175 automatically provides the DSP a vector pointing to the location in the memory 115 of the appropriate interrupt service routine corresponding to the interrupt request to be serviced next.

Figure 2:
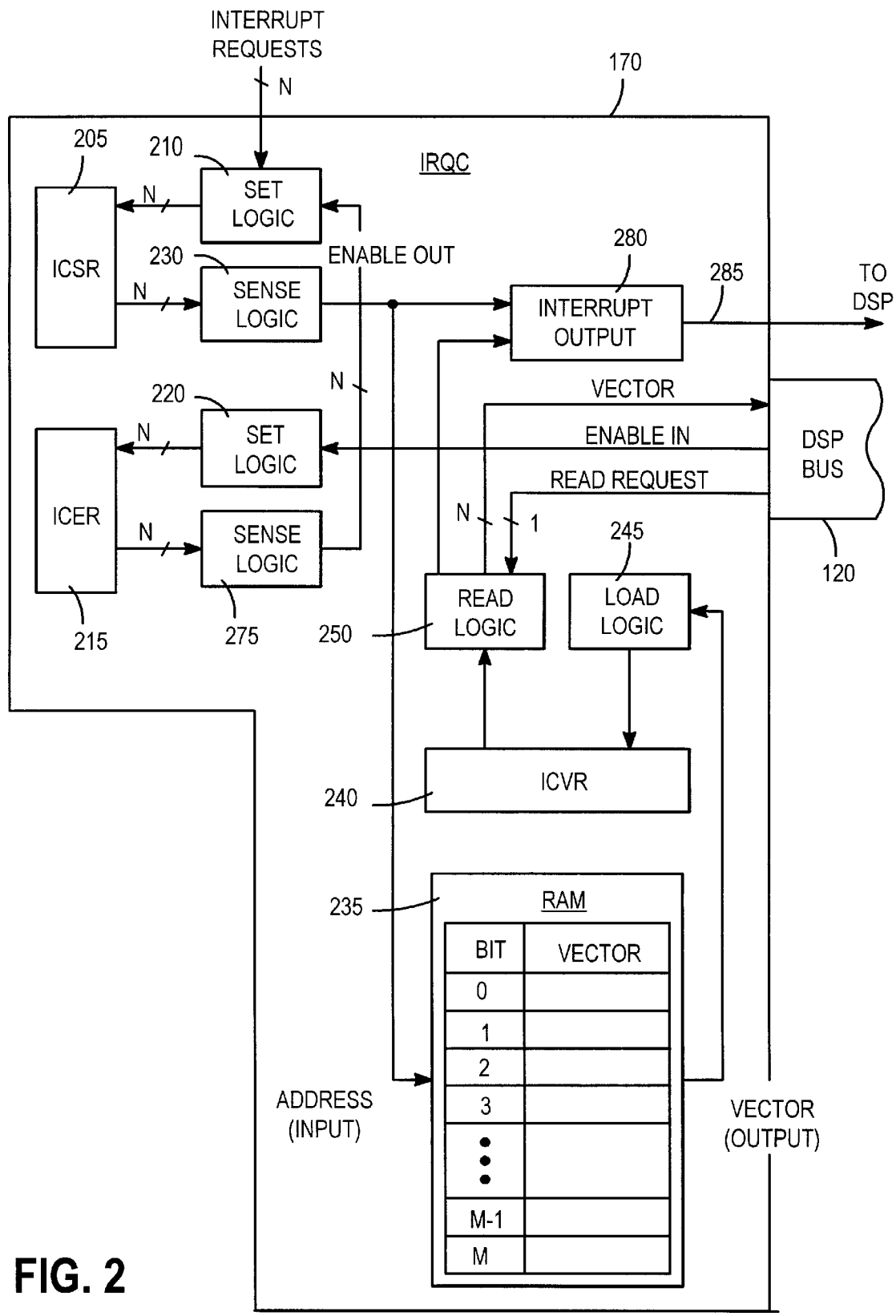
FIG. 2 is a block diagram of a typical interrupt request controller module in the modem circuit board of FIG. 1.

FIG. 2 illustrates a preferred architecture the interrupt request control module 170, which is the same as that of the other interrupt request control module 175. An N-bit interrupt control status register (ICSR) 205 tracks the status of N respective incoming interrupt requests, wherein N is typically 8 and each bit is a status flag. An ICSR set logic circuit 210 receives each of N incoming interrupt requests and sets corresponding ones of the N flags in the ICSR 205. In a preferred implementation, an n-bit interrupt control enable register (ICER) 215 provides N ICER flags. Each of these ICER flags may be de-asserted by the DSP 105 in case the DSP 105 does not wish to receive a corresponding interrupt request. This is an optional feature and is not particularly necessary to carry out the present invention. For this purpose, an ICER set logic circuit 220 asserts individual bits in the ICER 215 in response to an "enable in" signal controlled by the DSP 105. The "enable in" signal is resolved to individual bits in the ICER 215 using conventional techniques. An ICER sense logic circuit 225 identifies those bits in the ICER 215 which have been asserted and applies an "enable out" signal to the ICSR set logic circuit 210. It is this "enable out" signal which enables the ICSR set logic circuit to assert the corresponding flag in the ICSR 205 when a corresponding interrupt request is received by the ICSR set logic circuit 210. In this manner, the DSP 105 determines which interrupt requests it will receive.

An ICSR sense logic circuit 230 determines which one of the bits currently asserted in the ICSR 205 has the highest bit value. The N bit positions in the ICSR 205 are ranked consecutively from 1 through N (or, equivalently, 0 through N-1) according to their position in the register. This bit position will therefore have an integer value in the range of 1 through N. This bit value is applied from an output of the ICSR sense logic circuit 230 to an address input of a random access memory (RAM) 235. The RAM 235 contains a table illustrated in FIG. 2 which may be thought of as containing a pair of columns organized with rows in common. The left column corresponds to the address input of the RAM 235 and contains the bit values 1 through M (or 0 through M-1). The right column contains respective vectors, each pointing to an address in the memory 115 holding the interrupt service routine required to service the interrupt request corresponding to the bit value in the left column. Each such bit value applied by the ICSR sense logic circuit 230 to the address input of the RAM 235 causes the corresponding vector to be provided at the output of the RAM 235. An ICVR load logic circuit 240 takes this vector from the RAM output and writes it into an interrupt control vector register (ICVR) 240 where it may be read by the DSP at the appropriate instant. The DSP 105 asserts a "read request" signal when it wishes to read the ICVR 240. In response to the "read request" signal, an ICVR read logic circuit 250 outputs the contents of the ICVR 240 to the DSP 105. In further response to the "read request" signal, the ICSR set logic 210 deasserts the corresponding bit in the ICSR 205, which was the asserted bit with the highest bit value in the ICSR 205. This changes the contents of the ICSR 205 so that, now, the asserted bit with the highest value therein is a different bit. This causes the output of the ICSR sense logic circuit 230 to change accordingly. As a result, the ICSR sense logic circuit 230 applies a different bit value to the address input of the RAM 235, thereby obtaining a different vector at the output of the RAM 235. The load logic 245, after the current vector in the ICVR 240 has been read by the DSP in synchronism with the "read request" signal from the DSP 105, loads the new vector into the ICVR 240 where it is ready for the next read request by the DSP 105.

In order to prevent the DSP from wasting time with the interrupt request control module 170 when there are no interrupts pending, whenever the sense logic circuit 230 senses that all N bits in the ICSR are de-asserted, it points to a special location in the RAM 235 which holds a NULL vector, so that this vector is loaded into the ICVR. The DSP 105 is programmed so that whenever it reads a NULL vector in the ICVR 240 it immediately goes on to other tasks rather than making any further inquiries within the interrupt request control module 170, thus saving time.

An interrupt generator 280 asserts interrupts to the DSP 105 which are output to the DSP preferably on a separate interrupt output line 285 referred to briefly with reference to FIG. 1. The interrupt generator 280 receives the output from the ICSR sense logic 230 so that the interrupt generator 280 is signaled whenever any ICSR bit is asserted. The interrupt generator 280 also receives a read output from the read logic 250 so that the interrupt generator 280 is signaled whenever the ICVR register 240 is read. The interrupt generator 280 asserts an interrupt to the DSP whenever any bits in the ICSR register 250 are asserted. The interrupt generator 280 deasserts the interrupt to the DSP whenever it senses that the ICVR register 240 has been read at a time when no ICSR bits were asserted.

Figure 3:
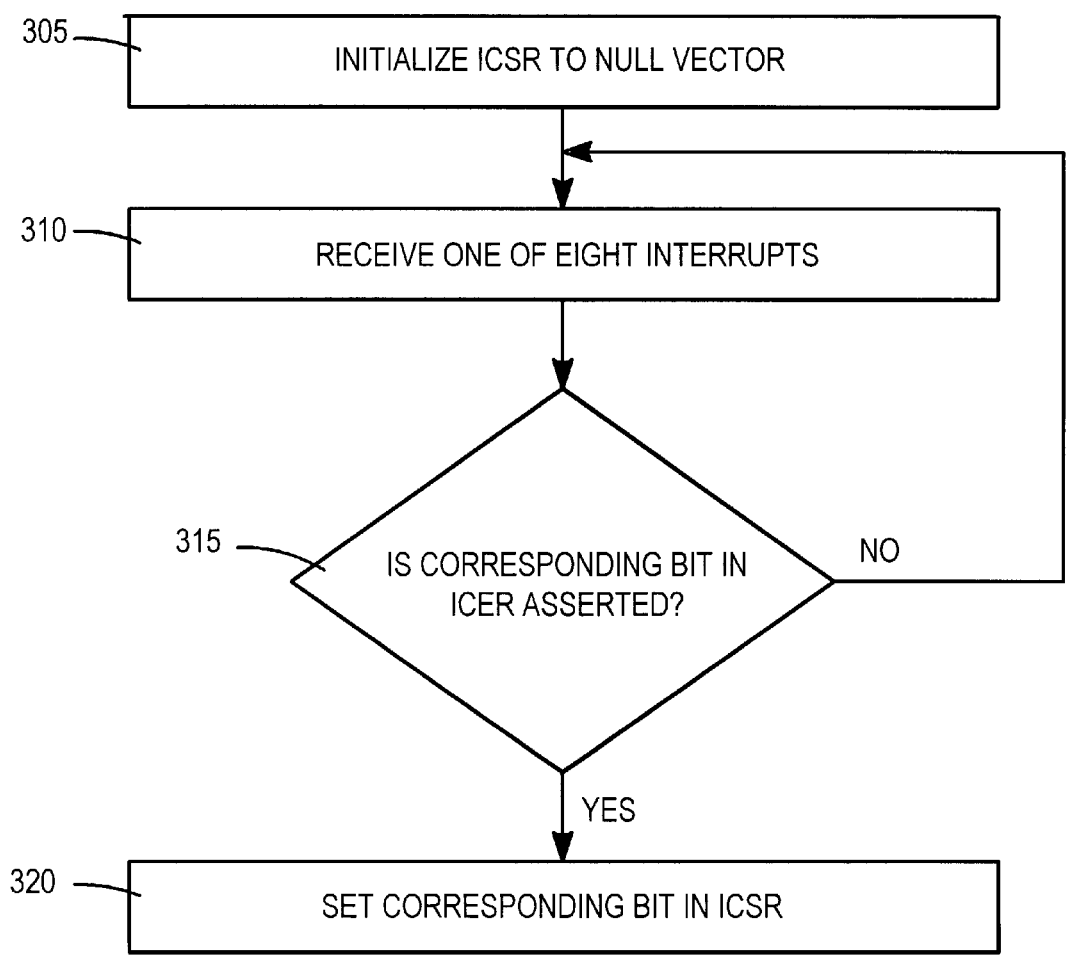
FIG. 3 is a flow diagram illustrating one aspect of the operation of the interrupt request controller module of FIG. 2.

FIG. 3 illustrates system initialization and how the ICSR contents changes upon the receipt of the first interrupt request. When the system is initialized, there are, typically, no interrupt requests pending, and therefore the ICSR sense logic 205 causes the NULL vector to be loaded from the RAM 235 into the ICVR (block 305 of FIG. 3). Thereafter, when an interrupt request is received by the ICSR set logic 210 (block 310), the ICSR set logic responds to the enable output of the ICER sense logic 275 (block 315). If the enable output is not asserted (NO branch of block 315), no action is taken. Otherwise (YES branch of block 315), the ICSR set logic 210 sets the bit in the ICSR 205 that corresponds to the interrupt request that was received (block 320).

Figure 4:
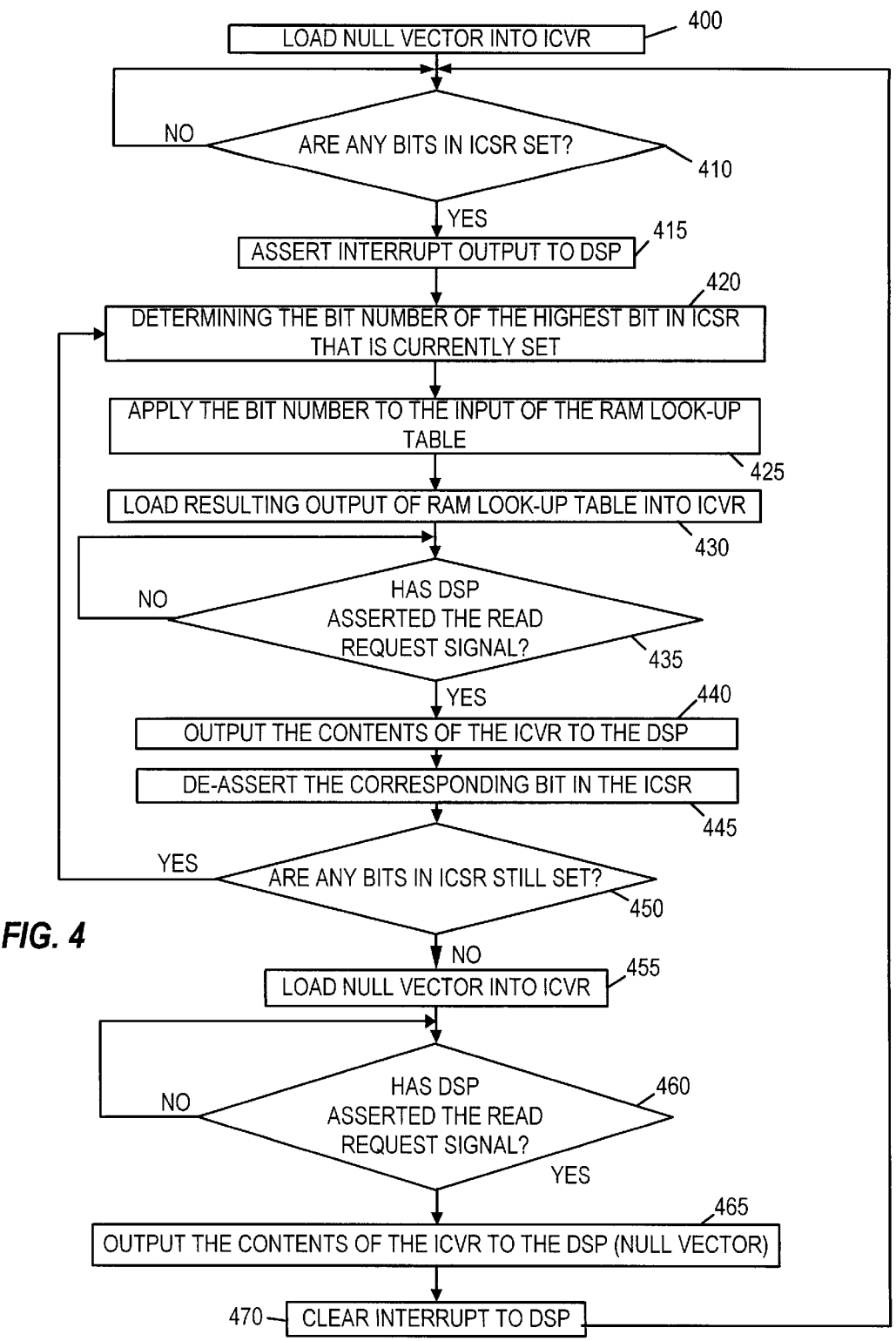
FIG. 4 is a flow diagram illustrating another aspect of the operation of the interrupt request controller module of FIG. 2.

FIG. 4 illustrates how the contents of the ICVR 240 is updated and how the interrupts to the DSP are asserted. Initially, the ICSR sense logic 230 outputs the RAM location of the NULL vector to the address input of the RAM 235 (block 400 of FIG. 4). If no bits in the ICSR 205 are currently asserted (NO branch of block 410), the system goes into a wait mode. Otherwise (YES branch of block 410), the interrupt generator 280 asserts an interrupt to the DSP (block 415). The ICSR sense logic 230 determines the bit value of the highest value bit in the ICSR 205 that is currently asserted (block 420 of FIG. 4). The ICSR sense logic 230 outputs the bit value of the highest valued bit currently asserted in the ICSR 205 (block 425). The RAM 235 responds by outputting the corresponding vector to the ICVR load logic 245. Thereafter, the ICVR load logic 245 writes over the prior contents of the ICVR 240 with this vector (block 430 of FIG. 4). The ICVR read logic circuit 250 waits (NO branch of block 435) until the "read request" signal is next asserted by the DSP 105 (YES branch of block 435), and then outputs the contents of the ICVR 240 to the DSP 105 (block 440). Simultaneously, the ICSR set logic 210, in response to the "read request" signal asserted by the DSP 105, de-asserts (resets) the corresponding flag in the ICSR 205, i.e., de-asserts the highest value bit in the ICSR 205 that is currently asserted (block 445). Thereafter, if the ICSR sense logic 230 finds any ICSR bits are currently asserted (YES branch of block 450), the ICSR sense logic 230 reverts to the step of block 420. Otherwise (NO branch of block 450), the ICSR sense logic 230 outputs the address of the NULL vector to the RAM address input, causing the NULL vector to be loaded into the ICVR register 240 (block 455). The ICVR read logic circuit 250 waits (NO branch of block 460) until the "read request" signal is next asserted by the DSP 105 (YES branch of block 460), and then outputs the contents of the ICVR 240 to the DSP 105 (block 465). At this point, the interrupt generator 280 senses that the ICVR register 240 has been read without any of the ICSR bits being set, and therefore clears the interrupt to the DSP (block 470). The system then returns to the step of block 410.

While in the preferred embodiment described above the NULL vector is stored in the RAM 235, in another preferred embodiment the NULL vector is stored in a separate register and is accessed separately.

While the invention has been described with reference to a modem having a DSP and an ASIC, the ASIC having certain modules and sub-modules therein, the invention may be carried out in a similar modem having an ASIC with modules and/or sub-modules different from those described in this specification. For example, the ASIC may have more or less than the two interrupt request control modules 170, 175 described herein. Also, the number N of bits in the ICSR, or the number of interrupt request input lines, may be different from the case of n=8 described herein.

While the invention has been described with reference to use in an embedded system consisting of a modem whose processor is a DSP, it is also useful in other embedded systems in which the processor may be a DSP-type processor or any other suitable type of processor or central processing unit.

While the invention has been described in detail by specific reference to preferred embodiments, it is understood that variations and modifications thereof may be made without departing from the true spirit and scope of the invention.

What is claimed is:

1. A system comprising a processor, an ASIC which generates at least N interrupt requests to be serviced by said processor, a memory accessible by said processor and containing at respective address locations therein individual interrupt services routines to be executed by said processor in servicing respective ones of said interrupt requests, and a processor bus connected to said processor, said ASIC and said memory, said system further comprising:
   an ICSR connected to receive said N interrupt requests and having N flags corresponding to respective ones of said N interrupt requests and reflecting pending status of respective ones of said N interrupt requests, said flags being associated with respective numbers according to a priority ranking of said interrupt requests;
   a look-up table containing, by said respective numbers, vectors corresponding to said respective address locations, said look-up table having a look-up table input and a look-up table output providing a vector corresponding to a number received at said look-up table input;
   an ICVR connected to said look-up table output and readable by said processor, whereby said ICVR contains a vector provided at said look-up table output;
   a controller having a controller input connected to said ICSR and a controller output specifying the respective number of the highest priority pending flag in said ICSR, said output being coupled to said look-up table input, said controller further including logic circuitry which changes the status of a pending flag in said ICSR upon said processor reading the corresponding vector in said ICVR, whereby the contents of said ICVR is updated to reflect the current highest priority pending interrupt request.

2. The system of claim 1 wherein:
   said look-up table further contains a null vector;
   said controller output specifying said null vector to said look-up table input whenever none of said N interrupt requests is pending, whereby said ICVR contains said null vector in the absence of pending interrupt requests.

3. The system of claim 1 wherein said ICSR, said ICVR, said look-up table and said controller are comprised within said ASIC.

4. The system of claim 1 wherein said ICSR circuit comprises an ICSR register having N bits associated with said N interrupt requests, the priority of each interrupt request determined by the corresponding bit position in said ICSR register.

5. In a system comprising a processor, an ASIC which generates at least N interrupt requests to be serviced by said processor, a memory accessible by said processor and containing at respective address locations therein individual interrupt services routines to be executed by said processor in servicing respective ones of said interrupt requests, and a processor bus connected to said processor, said ASIC and said memory, an interrupt request control module, comprising:
   an ICSR circuit connected to receive said N interrupt requests and provide a flag for each reflecting the pending status thereof, each flag associated with an interrupt number corresponding to a priority ranking of said N interrupt requests, said ICSR circuit outputting the interrupt number of a pending flag having the highest priority;
   a look-up table connected to said ICSR circuit and containing vectors corresponding to said respective addresses, said look-up table outputting a selected one of said vectors corresponding to a current interrupt number output by said ICSR circuit;
   an ICVR readable by said processor and connected to said look-up table, whereby said ICVR contains a vector provided at said look-up table output;
   logic circuitry which changes the status of a pending flag in said ICSR upon said processor reading the corresponding vector in said ICVR, whereby the contents of said ICVR is updated to reflect the current highest priority pending interrupt request.

6. The system of claim 5 wherein:
   said look-up table further contains a null vector;
   said controller output specifying said null vector to said look-up table whenever none of said N interrupt requests is pending, whereby said ICVR contains said null vector in the absence of pending interrupt requests.

7. The system of claim 5 wherein said interrupt request control module is comprised within said ASIC.

8. The system of claim 5 wherein said ICSR circuit comprises an ICSR register having N bits associated with said N interrupt requests, the priority of each interrupt request determined by the corresponding bit position in said ICSR register.

9. In a system comprising a processor, an ASIC which generates at least N interrupt requests to be serviced by said processor, a memory accessible by said processor and containing at respective address locations therein individual interrupt service routines to be executed by said processor in servicing respective ones of said interrupt requests, and a processor bus connected to said processor, said ASIC and said memory, a method for managing said interrupt requests, comprising:
   providing an interrupt control vector register readable by said processor;

flagging the current pending status of each of said N interrupt requests and associating each of said N interrupts requests with an interrupt priority rank;

storing N vectors corresponding to said respective address locations;

determining which of said N interrupts that is currently flagged as pending has the highest priority rank and updating the contents of said interrupt control vector register by loading into said register the vector corresponding to the pending interrupt having the highest priority ranking;

after said processor has read said register, de-flagging the status of the corresponding one of said N interrupt requests, whereby a different one of the N interrupt requests can then become the highest priority pending interrupt, and repeating said determining and updating steps.

10. The method of claim 9 wherein said updating step further comprises:

if said determining step finds none of the N interrupt requests to be pending, then causing a null vector to be loaded into said interrupt control vector register.

11. The method of claim 9 wherein said processor is programmed to service none of said N interrupt requests upon finding said null vector in said interrupt control vector registers.

12. In a system comprising a processor, an ASIC which generates at least N interrupt requests to be serviced by said processor, a memory accessible by said processor and containing at respective address locations therein individual interrupt service routines to be executed by said processor in servicing respective ones of said interrupt requests, and a processor bus connected to said processor, said ASIC and said memory, a method for managing said interrupt requests, comprising:

providing an interrupt control status register having N bits associated with said N interrupt requests, each of said bits being asserted upon receipt of the corresponding interrupt request, and for each of said N bits, determining the priority of the corresponding interrupt request in accordance with the corresponding bit position, whereby the contents of said interrupt control status register reflects the identity of the highest priority currently pending interrupt request;

providing an interrupt control vector register readable by said processor;

storing N vectors corresponding to said respective address locations;

updating the contents of said interrupt control vector register by loading into said register the vector corresponding to the pending interrupt having the highest priority ranking in accordance with the interrupt control status register;

after said processor has read said interrupt control vector register, de-asserting the corresponding bit in said interrupt control status register, whereby a different one of the N interrupt requests becomes the highest priority pending interrupt, and repeating said updating step.

13. The method of claim 12 wherein said updating step further comprises:

if said determining step finds none of the N interrupt requests to be pending, then causing a null vector to be loaded into said interrupt control vector register.

14. The method of claim 13 wherein said processor is programmed to service none of said N interrupt requests upon finding said null vector in said interrupt control vector registers.

15. The method of claim 12 further comprising:

asserting an interrupt to the processor whenever any bit in the interrupt register is asserted;

deasserting the interrupt to the processor whenever the null vector is provided to the processor.

* * * * *